Sept. 16, 1958     J. E. HIGH     2,852,220
HOSE CLAMP

Filed May 12, 1954     3 Sheets-Sheet 1

John E. High
INVENTOR

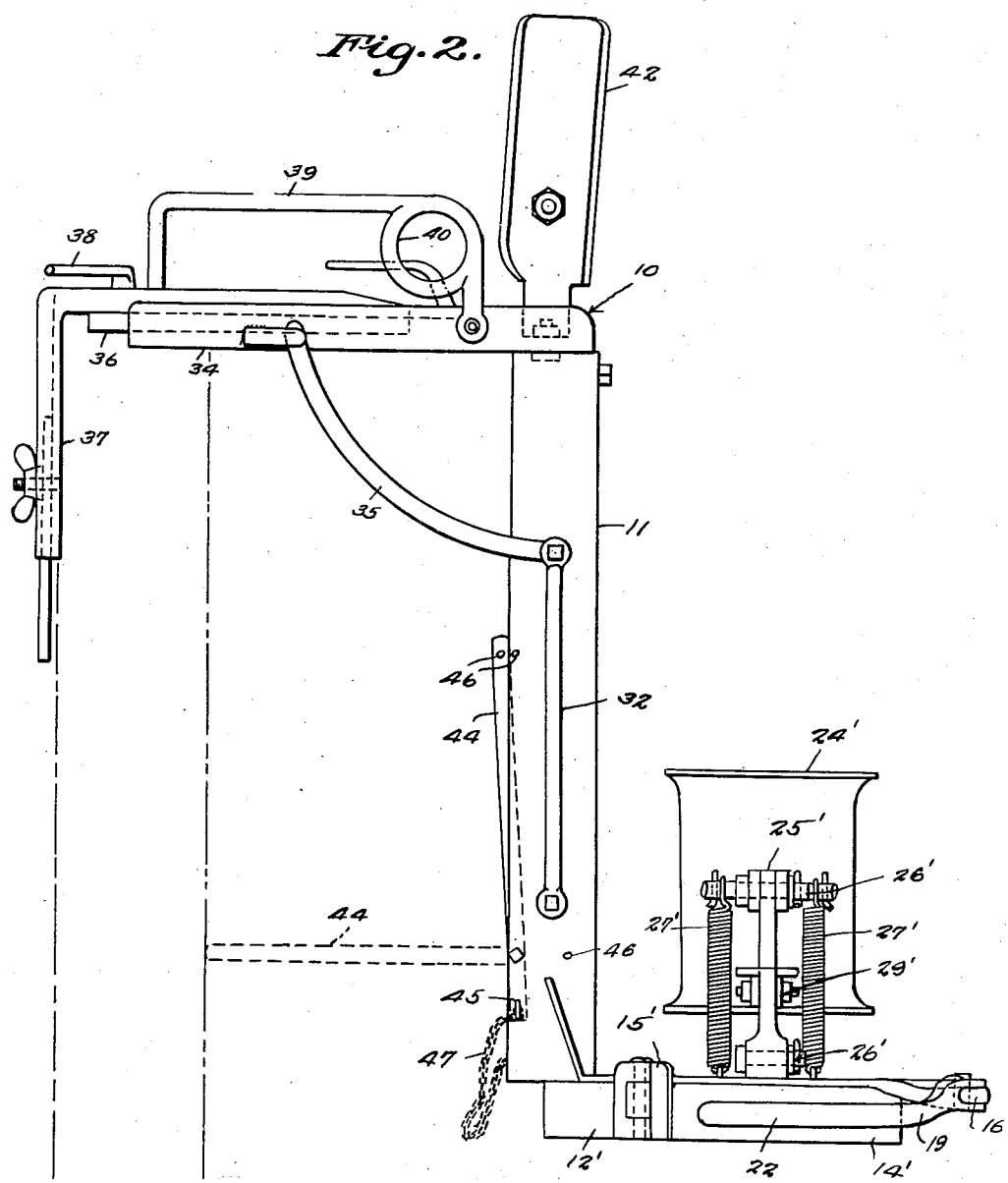

Sept. 16, 1958　　　　J. E. HIGH　　　　2,852,220
HOSE CLAMP
Filed May 12, 1954　　　　　　　　3 Sheets-Sheet 3
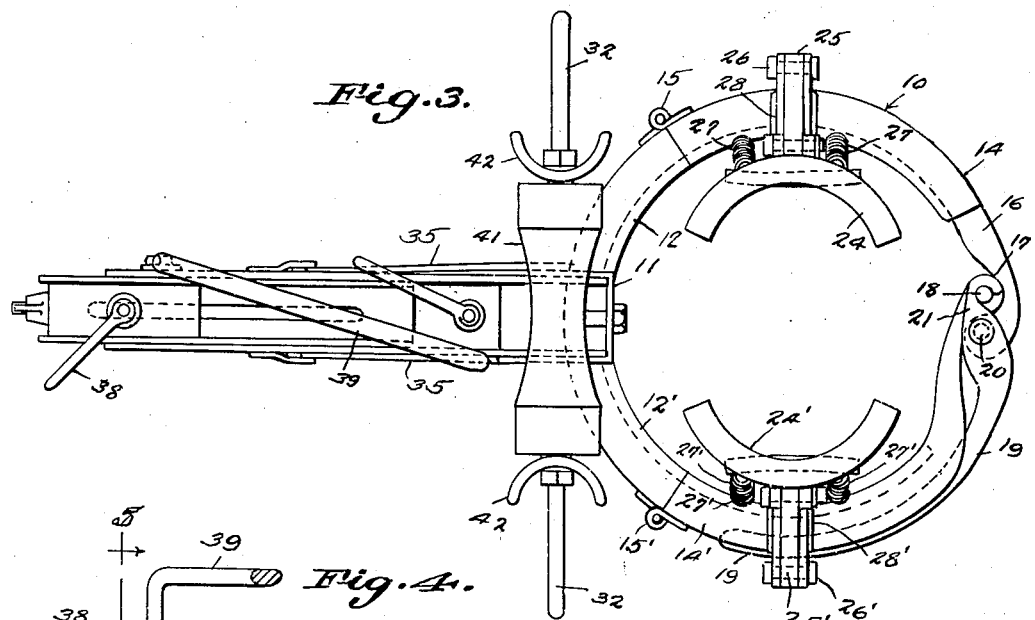
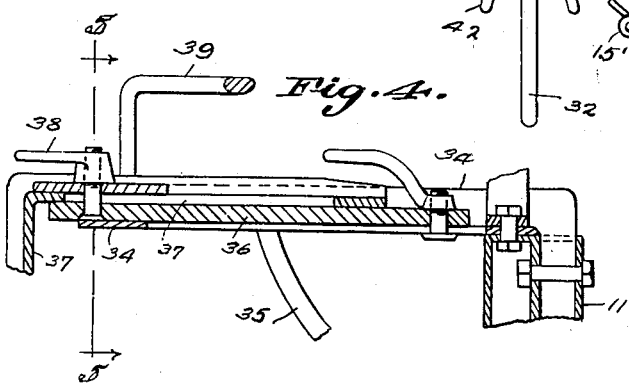
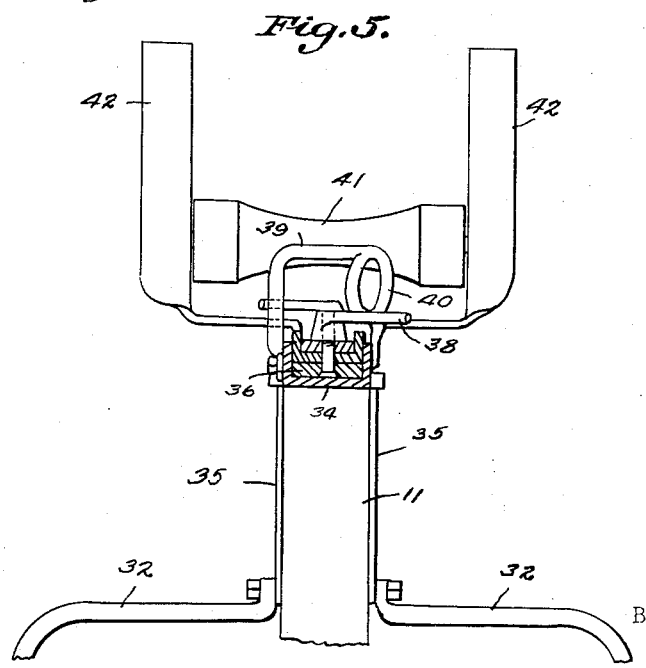
John E. High
INVENTOR
BY CASnow&Co.
ATTORNEYS.

2,852,220
HOSE CLAMP

John E. High, Winston-Salem, N. C.

Application May 12, 1954, Serial No. 429,341

3 Claims. (Cl. 248—78)

This invention relates to a hose clamp and more particularly to a hose clamp for clamping about a fire hose when it is desired to use and transport the fire hose from one place to another while in the process of handling the fire hose.

It is an object of this invention to provide a fire hose clamp of the kind to be more particularly described hereinafter having clamping jaws engageable about a fire hose either adjacent to the nozzle of the hose or at any location along the length of the hose with the clamp being releasable from the fire hose by a fireman or other persons desiring to disengage the hose clamp from the hose when the hose is being gathered together or gathered up after a fire or after the purpose of the hose has been accomplished.

It is another object of this invention to provide an improved hose clamp of this kind wherein the hose clamp may be manually clamped about the hose when it is desired to move the hose from one place to another, even upwardly as by a ladder and to disengage the clamp from the hose by merely kicking the hose clamp whereby the hose clamp will be disengaged from the hose. In this manner the hose may be easily rolled up for further transportation and the hose clamp may be carried separate from the hose.

Other and further objects and advantages of the invention will be hereinafter described and the novel features thereof defined in the appended claims.

In the drawings:

Fig. 2 is a side elevation thereof.

Fig. 3 is a top plan view.

Fig. 4 is a fragmentary side elevation, partly broken away and partly in section of the hose clamp.

Fig. 5 is a transverse section taken on the line 5—5 of Fig. 4.

Figure 1:
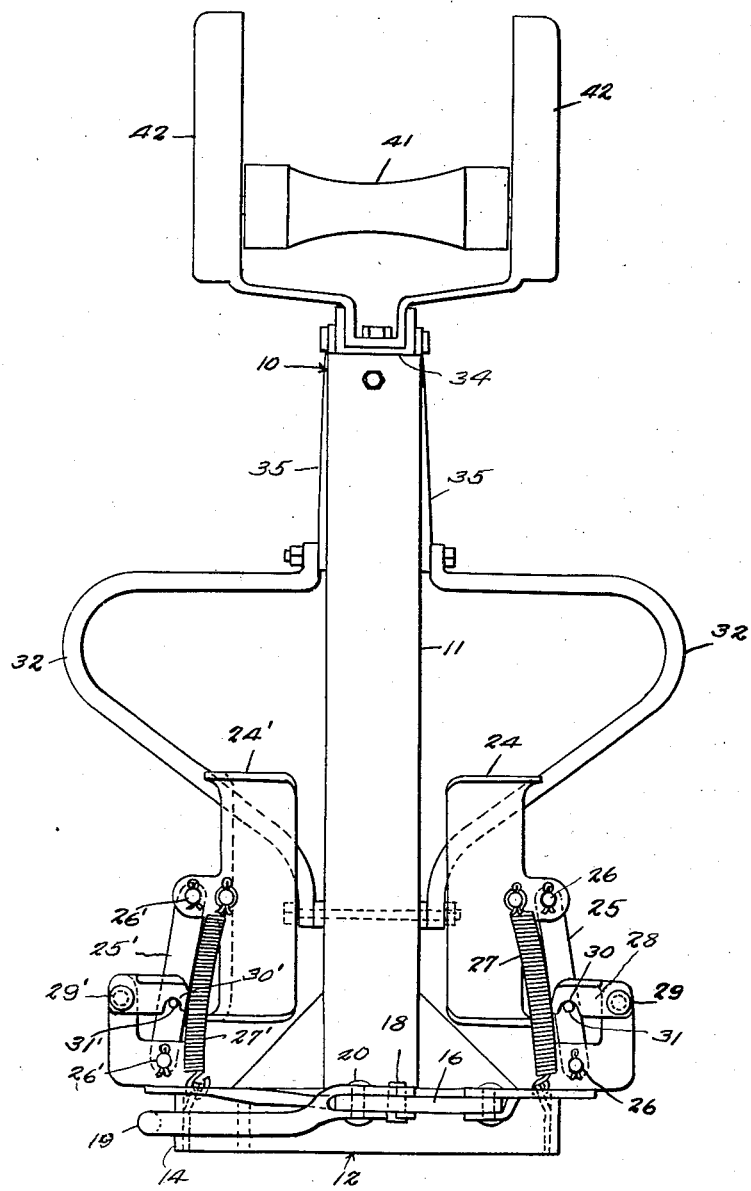
Fig. 1 is a front elevation of a hose clamp constructed according to an embodiment of my invention.

Referring more particularly to the drawings the numeral 10 designates generally a hose clamp constructed according to an embodiment of my invention.

The hose clamp 10 is preferably formed of lightweight metal and has an upstanding support 11 with a pair of clamping arm segments 12 and 12' secured to one end of the support or formed integral therewith. A pair of hose clamp jaws 14 and 14' are pivotally mounted on each end of the clamping arm jaw supporting segments 12 by a hinge 15 and 15' so that each of the hose clamp jaws 14 and 14' may be pivotally spread apart from the support 11 at the time when the hose is to be clamped between the clamping jaws.

In order to manipulate the clamping jaws they are releasably secured together and the clamping jaws 14 have a fixed toggle arm 16 formed therewith, the fixed toggle arm 16 having a concavity 17 remote from the support 11 and closely adjacent to the other clamping jaw 14' when the clamping jaws are positioned closely together with a hose to be clamped therebetween. A pin 18 is secured to the fixed extreme tip of clamping jaw 14' outwardly of the concavity 17 and a pivotal toggle link 19 having a hook 21 at its end is pivotally mounted by means of a pin 20 on the end of toggle arm 16 for linking cooperation with the pin 18. In other words the one hose clamping jaw 14 has a single fixed arm 16 having a pivotal arm connected thereon by a pivoted toggle link and the other clamping jaw 14' carries the pin 18 so that the clamping jaws 14, 14' may be either released apart or clamped together at the wishes and desires of the operator of the hose clamp.

This type of clamping means lends itself readily for clamping engagement about a hose as actuated by the hands of an operator and releasable from the hose by the feet of the operator.

Each of the hose clamp jaws 14, 14' is provided with an arcuate tubular hose clamping segment 24, 24' extending upwardly therefrom somewhat in parallelism with the support 11. Each of the arcuate tubular segments 24 and 24' is connected to the respective hose clamping jaws 14 and 14' by a link 25 and 25' respectively which are hingedly connected at one end to the arcuate segment 24 and 24' and hingedly connected at the other end to its associated hose clamp jaw 14 or 14'. This hinged connection at the opposite ends of the link 25 and 25' is accomplished by hinge pins 26 and 26' which extend through their associated link and the tubular segment of the clamping jaw.

Springs 27 and 27' are fixedly connected at their opposite ends to the hose clamp jaws 14 and 14' and the arcuate segment 24 and 24' for constantly urging the respective arcuate segments toward each other for clamping engagement with a hose to be clamped therebetween.

Toggle arms 28 and 28' are pivotally connected by hinges 29 and 29' to the jaws 14 and 14' and held against movement by the springs 27, 27' by hooks 30, 30' on the toggle arms 28 and 28' which engages with pins 31 and 31' on the link 25 and 25'. In this manner each of the arcuate segments 24 and 24' may be held outwardly from the other arcuate segment by the toggle which includes the arms 28 and 28' and the pin 31 and 31' on the link 25 and 25'. These last mentioned toggles may be released by moving the toggle arm so that a hook 30, 30' disengages its respective pin 31, 31' at which time the full tension of the springs will carry the links and the respective arcuate segments pivotally mounted thereon toward the other arcuate segment so that the size of the hose being used will adequately be compensated for by the links with their respective toggle hook connections to the different hose clamp jaws.

A handle 32 is carried by the support 11 longitudinally thereof on the opposite sides of the support so that the entire hose clamp may be carried about in any condition, either extended or retracted before and after the hose clamp 10 has been engaged with a hose.

An outwardly extending U-shaped arm 34 is fixedly carried by the other end of the support 11, remote from the clamping jaws 14 and this arm 34 is held in position both by its welded connection to the support and by a brace 35 which is pivotally connected to the support 11 at one end of the handle 32 and is releasably engaged with the sides of the U-shaped arm 34.

A flat bar 36 is slidably supported on the U-shaped arm 34 between the sides thereof and an L-shaped bar 37 is slidably supported on the flat bar 38.

A nut having a nut handle 38 is used for securing both the flat bar 36 and the L-shaped bar 37 to the U-shaped supporting arm 34. The arm 34 with the L-shaped bar 37 is adapted to be engaged with a side of a building or the like for properly positioning the hose clamp 10 where desired.

An outwardly extending handle 39 is secured to the arm 34 and extends upwardly therefrom so that the hose clamp may be moved about either independently of a hose or with a hose clamped therein. A loop 40 is formed integral with the handle 39 and is adapted to be engaged with a rope or cable for lifting the hose clamp 10 when it is engaged with a hose. The engagement of the loop 40 with a cable or clamp will be used for moving the hose clamp vertically relative to the ground with the hose therein much in the same manner as a hose clamp is ordinarily used today.

A roller 41 is carried by the extreme upper end of the support 11, the roller being rotatably supported between a pair of vertically extending roller supporting arms 42 which are fixed to the extreme upper end of the support 11.

When the hose clamp 10 is being used at some distance above the ground, the force exerted on the outwardly extending arm 34 is somewhat alleviated by a brace arm 35 which is pivotally connected to the support 11 remote from the arm 34. The brace arm 44 is pivotally connected at one end to the support 11 and held in its extended position relative to the support by a lock pin 45 which may be engaged in a lock pin hole 46 in both the brace arm 44 and the support 11. This free end of arm 44 will also become wedged against the building to prevent the hose clamp from being pulled from the wall when the hose is pulled upwards through the clamp is positioning the hose. A chain 47 is connected to one end of the lock pin 45 and to the extreme lower end of the support 11 so that the lock pin will not be inadvertently removed from the hose clamp 10 described above.

In the use and operation of the hose clamp 10, above, the hose clamp is carried about by a person grasping the handle 32 on the opposite sides of the support 11 so that the support and the hose clamp may be moved about from one place to another.

The hose clamp jaws 14 may then be initially spaced apart the maximum distance provided so that a hose may be easily laid between the clamping jaws 14 before the jaws 14 are secured together by the disengagable toggle link connection therebetween. With a hose thus connected between the hose clamp jaws 14 the entire hose clamp may be elevated by engaging a flexible lifting device with the handle 39 or the loop 40. The hose thus clamped by the hose clamp 10 may be extended above the hose clamp and above the upper end of the support 11 for engaging with the hose roller 41.

The hose may be removed from the hose clamp by disengaging the clamping jaws 14 upon disengaging the pivotal toggle link 19 as by the foot of a fireman.

While the specific details of one embodiment of this invention have been herein shown and described, the invention is not confined thereto as changes and alterations may be made without departing from the spirit and scope thereof as defined in the appended claims.

I claim:

1. An improved hose clamp of the kind described comprising an upstanding, elongated support, an arcuate arm segment secured in perpendicular relation to said support, a pair of arcuate hose clamping jaws, each pivoted at one end to an adjacent end of said arm segment for swinging movement in the plane of said arm segment, said arm segment and said jaws forming an open loop, quick release means releasably securing the ends of said jaws together, an upwardly extending link pivoted to each jaw for swinging in a plane perpendicular to the plane of said arm segment, an arcuate clamping sleeve segment pivotally connected to the other end of each link, the pivots of the pivotal connection between said links and said jaw and the pivots of the pivotal connection between each link and each sleeve segment being parallel, tension springs normally biasing each sleeve segment toward clamping relation with a hose adapted to be clamped between said segments, said quick release means comprising a fixed toggle arm secured to the free end of one jaw, a second toggle arm connected to the free end of the other jaw, and a toggle link pivoted to one of said arms and engageable with the other arm for securing said jaws and said sleeve segments in hose clamping relation.

2. The structure of claim 1 wherein an arm is fixed to said support at a point remote from said jaws and extends laterally therefrom on the side opposite said arm segment, an arm extending bar slidable on said arm, and an L-shaped bar slidable on said arm extending bar, a portion of said L-shaped bar extending beyond the ends of said arm and said arm extending bar to form a hook for engagement with a supporting element, said arm extending bar being adjustable with respect to said arm to accommodate different shapes and sizes of supporting elements.

3. The structure of claim 1 wherein a brace is provided between said arm and said support, said brace being pivoted at one end to said support and releasably connected at its other end to said arm.

References Cited in the file of this patent

UNITED STATES PATENTS

| | | |
|---|---|---|
| 382,590 | Clay | May 8, 1888 |
| 1,837,939 | Zimmerman | Dec. 22, 1931 |
| 2,449,719 | Rumsey | Sept. 21, 1948 |
| 2,464,958 | Allen | Mar. 22, 1949 |
| 2,517,566 | High | Aug. 8, 1950 |